United States Patent Office 3,313,781
Patented Apr. 11, 1967

3,313,781
HIGH MOLECULAR WEIGHT POLYESTER SUITABLE FOR USE AS ELECTRICALLY INSULATING MATERIAL, AND METHOD OF MAKING THE SAME
Hans J. Beck, Hamburg, and Karl Schmidt, Hamburg-Uhlenhorst, Germany, assignors to Dr. Beck & Co. G.m.b.H., Hamburg, Germany
No Drawing. Filed Apr. 26, 1963, Ser. No. 276,089
14 Claims. (Cl. 260—75)

This application is a continuation of our patent application Serial No. 707,446, filed January 6, 1958, entitled "High Molecular Weight Polyester Lacquers."

The present invention relates to high molecular weight polyester lacquers, and more particularly to such lacquers formed from terephthalic acid as the basic component, and to new methods of producing such lacquers.

The new polyesters of the present invention can be used for high temperature resistant wire lacquers for electro-insulation of metal wires.

Esters of terephthalic acid have in the last several years been utilized for many purposes. The main use for such esters, namely poly-terephthalic acid-glycol-esters, has been in the fiber and foil industries. For quite some time it has been considered that such terephthalic acid esters might be utilized for lacquer coating of wires to electrically insulate the wires. Various processes have been tried for this purpose.

The glycol ester which is per se very thermal-stable is not suitable for the lacquering of wires because it is not possible to produce a stable solution therefrom. Attempts were made to avoid this difficulty by utilizing an excess of glycol during the primary reaction of terephthalic acid with glycol so that the resulting ester still contained free hydroxyl groups and then in a subsequent reaction reacting these free hydroxyl groups with other aliphthatic dicarboxylic acids such as adipic acid or sebacic acid. By the introduction of these foreign dicarboxylic acids solubility in solvents such as cresol resulted. Moreover, the heat stability was greatly reduced and the softening temperature was undesirably lowered.

It is also possible to substitute glycol by glycerine in forming the ester so that the two end groups of the glycerine are esterified with the terephthalic acid. Such product could be utilized as a lacquer for wires and the like. However in order to improve the heat stability of such product it is necesary to react this product with silanes or short chain siloxanes. Pure glycerine esters of terephthalic esters tend also to react with the middle hydroxyl group to result in a strong cross-linking which results in the product becoming brittle and also in a large degree of shrinking of the final product.

All attempts to produce lacquers for the coating of wires in order to electrically insulate the same utilizing terephthalic acid as the basis have been unsuccessful.

It is therefore a primary object of the present invention to provide a new composition of matter lacquers which are highly heat stable and have all other properties to make the same suitable for the lacquering and insulation of wires and the like.

It is another object of the present invention to provide new high molecular weight polyester resins in which terephthalic acid is the basis of the resin.

It is still another object of the present invention to provide a method which is particularly adapted to the production of high molecular weight poly-terephthalic acid lacquers.

It is yet another object of the present invention to provide a method of producing the new compositions of the present invention.

Other objects and advantages of the present invention will be apparent from a further reading of the specification and of the appended claims.

With the above objects in view, the present invention mainly comprises as a new composition of matter a high molecular weight polyester consisting essentially of terephthalic acid as acid component and both glycol and glycerine as alcoholic component, the ratio of equivalents of said glycol to said glycerine being between 1:0.9 and 1:1.1, and the ratio of equivalents of carboxyl groups of the acid component to the hydroxyl groups of the alcohol component (both the glycol and the glycerine) being between 2.1:3 and 2.4:3. Preferably the ratio of equivalents of glycol to glycerine is about 1:1 and the ratio of equivalents of carboxyl groups of the acid component to the hydroxyl groups of the alcohol component is about 2.25:3.

The term "ratio of equivalents" as used throughout the specification and claims of this case is meant to refer to the ratio of numbers of reactive groups. Thus, for example, one molecule of glycol contains two reactive (hydroxyl) groups while one molecule of glycerine contains three reactive (hydroxyl) groups. Therefore, one gram molecular amount of glycol contains two-thirds the number of reactive groups of one gram molecular amount of glycerine, and assuming gram molecular amounts of glycol and glycerine the ratio of equivalents of the glycol to the glycerine would be 2:3. This definition refers not only to the hydroxyl groups of glycol and glycerine but likewise to the carboxyl groups of terephthalic acid or terephthalic acid esters or reactive groups of any other substances mentioned herein.

The method of producing high molecular weight polyester lacquers in accordance with the present invention mainly comprises the steps of subjecting terephthalic acid-dimethyl-ester to interesterification with a mixture of glycol and glycerine in an amount such that the hydroxyl groups of the glycol and the glycerine are in excess, thereby obtaining an interesterified reaction product, esterifying the thus-obtained interesterified reaction product with terephthalic acid so as to obtain an esterification reaction product, and subjecting the thus-obtained esterification reaction product to polycondensation in order to obtain a high molecular weight polyester lacquer.

It is preferred that the ratio of equivalents of the terephthalic acid-dimethyl-ester to the terephthalic acid should be between 2:0.2 and 2:0.4 in accordance with the present invention. The ratio of equivalents of the carboxyl groups of the terephthalic acid-dimethyl-ester to the hydroxyl groups of the glycol and the glycerine is preferably between 1.82:3 and 2.13:3, and is most preferably about 2:3.

In accordance with a preferred embodiment of the present invention the lacquer which is produced in accordance with the present invention is cross-linked, preferably on the metal wire, such as copper wire, in order to harden the same utilizing butyl titanate as a cross-linking agent. In such case the butyl titanate takes part in a chemical reaction and remains in the final product as bound o-titanic acid which can be considered an inorganic ester component of the final product. In such case, the ratio of equivalents of the acid component, that is both the terephthalic acid-dimethyl-ester and the terephthalic acid carboxyl groups to this inorganic ester component, that is the reactive groups of the o-titanic acid, is preferably between 100:1 and 10:1 and is most preferably about 100:2.

The amount of the butyl titanate to be utilized in this final cross-linking operation may be determined as follows: If a vertical lacquering of wires or the like is to be carried out by means of nozzles, a higher content of butyl titanate is utilized. This higher content permits for a faster initial capacity of the lacquer during the heating action of the oven. If a horizontal lacquering by means of felt strips is carried out then the addition of butyl titanate should be less. In this respect it should be noted that other suction ratios may be utilized and in such event a faster initial capacity is undesirable.

In the first stage of the present invention, that is the interesterification of the terephthalic acid-dimethyl-ester with the mixture of glycol and glycerine, it is preferred to utilize an interesterification catalyst which is soluble and remains soluble in the reaction medium. Such interesterification catalysts are for example naphthenates and octoates of zinc, cerium, lead and calcium as well as alcoholates of metals of the second and third main groups of the periodic system such as magnesium and aluminum, and particularly magnesium naphthenate and aluminum butylate, as well as butyl titanate. The usual interesterification catalysts such as metal oxides have the disadvantage that during the process they must be filtered from the reaction medium while in accordance with the present invention the use of soluble catalysts avoids this difficulty.

The interesterification stage of the present invention is preferably carried out by slowly and continuously increasing the temperature to about 205° C. whereby approximately the theoretical amount of freed methanol is distilled off.

The tendency of the terephthalic acid-dimethyl-ester to sublimate can be practically completely avoided by adding about 5–10% of the total of the reactants of cresol to the reaction mass.

The second reaction stage of the process of the present invention, that is the esterification of the interesterified reaction product with terephthalic acid is actually a direct esterification. At temperatures of preferably between 180 and 220° C. free terephthalic acid is added and esterified in two portions with the reaction product of the first stage. As indicated above, the ratio of equivalents of terephthalic acid-dimethyl-ester to the terephthalic acid should preferably be between 2:0.2 and 2:0.4.

The third reaction stage of the present invention, which is preferably carried out after cooling the reaction product obtained from the second reaction stage is polycondensation of the reaction product of the second reaction stage. This polycondensation is preferably carried out in the presence of a polycondensation catalyst such as zinc naphthenate, zinc octoate, lead naphthenate or lead octoate.

The third reaction stage, that is the polycondensation, is preferably carried out after first distilling off cresol which is present from the first and second reaction stages and also any possible methanol which might remain, which substances would disturb and hinder the third reaction stage of polycondensation, by subjecting the reaction product of the second reaction stage to a temperature of between 140 and 170° C. under vacuum. The polycondensation catalyst such as zinc naphthenate may be added before subjecting the reaction product of the second reaction stage to the vacuum and temperature of 140–175° C.

The third reaction stage of polycondensation takes place preferably in a temperature range of between 220 and 230° C. The progress of the condensation is determined by the measurement of the viscosity of samples in a 40% cresol solution. When the desired degree of viscosity is attained, this lies at about 20′ DIN (Deutsche Industrie-Norm) at 20° C. and using a nozzle having a diameter of 4 mm. for a 40% solution, the reaction mass is taken up in cresol and an additional amount of between 1 and 2% of butyl titanate and between 0.2 and 0.7% of p-toluol-sulfonic acid is added in the warm, these amounts being calculated on the solid body content, as further catalysts. After a short reaction time the final product is taken up in an additional amount of cresol.

It has surprisingly been shown that by proceeding as set forth above a particularly easily workable lacquer for wires is obtained which exhibits a maximum of the best characteristics for such lacquer. The obtained product exhibits, when lacquered on metal wire, a hitherto unobtainable stability against heat, moisture and solvents, as well as a fine substance stability and good elasticity. There can thus be obtained copper wire lacquers exhibiting extraordinarily good electrical insulation values, particularly loss angle, insulation resistance and breakdown voltage, even after very long storage of the wire at temtemperatures of 150–175° C.

A demonstration of the substance stability of the artificial resins produced in accordance with the present invention with respect to high temperature may be observed in the fact that a lacquer film of the present invention after 1400 hours of aging at 175° C. only exhibits a loss of the substance of about 5.6%. This is only a fraction of the loss of substance of wire lacquers produced prior to the present invention which have under the same conditions a loss of 30 and more percent. This value is in fact comparable with the best silicon resins now on the market.

Besides the excellent electrical and thermal properties of the products produced in accordance with the method of the present invention the same also have a very good solvent stability which is quite superior to that of the known wire lacquer substances. The wire lacquers of the present invention are particularly stable against aromatic hydrocarbons, alcohols, esters and halogen hydrocarbons such as are found in refrigerating apparatus. Furthermore, the finished wire lacquers of the present invention have no tendency toward the formation of hair cracks which practically all of the hitherto utilized wire lacquers are subject to and therefore utilizing the lacquers of the present invetnion an undesired weakening of the insulation action is avoided.

Prior to the present invention such great number of positive excellent properties was unobtainable in the lacquering of wires for electro-insulation thereof.

The following examples are given to further illustrate the present invention. The scope of the invention is not, however, meant to be limited to the specific details of the examples.

*Example 1*

193.2 parts by weight of glycerine and 193.2 parts by weight of glycol (a ratio of equivalents of 1:1) as well as 105 parts by weight of cresol, DAB No. 6 (German Pharmacopoea, 6th edition), 815 parts by weight of terephthalic acid - dimethyl - ester and 3.57 parts by weight of cerium naphthenate in 6% solution of an aromatic hydrocarbon such as toluol, xyol or solvent naphtha, are, in the above set forth sequence, introduced into a three-necked flask the middle neck of which is provided with a stirrer, one side neck with a thermometer and the other side neck with a distillation attachment. The reaction mixture is heated quickly to 140° C. and the temperature is then increased about 5° C. per hour until a temperature of 205° C. is reached. At 190° C. the reaction is achieved by introducing carbonic acid. During the reaction process a distillate amounting to about 300 parts by weight of liquid is obtained which consists mainly of methanol. It is then cooled to 180° C.

43.6 parts by weight of terephthalic acid is then added to the reaction mass which is susbequently heated to 215° C. and maintained at this temperature for 1 hour. The reaction mixture is then again cooled to 180° C. and an additional 43.6 parts by weight of terephthalic acid are added, the reaction mixture heated to 215° C. and maintained at this temperature for ¾ of an hour. During this esterification process about 25 parts by weight of distillate is obtained, which consists mainly of water. The reaction mass is then again cooled and when a temperature of 200° C. is arrived at 10.5 parts by weight of zinc napthenate solution with a content of 8% zinc is added and the cooling is again proceeded to a temperature of 140° C. The reaction mixture is then distilled under 30 mm. Hg of pressure during a time period of 3 hours at a temperature of 140–175° C. There is thus obtained about 80–90 parts by weight of a distillate which consists mainly of cresol.

After the completion of the vacuum distillation the temperature is increased during a time period of about 3 hours to 225° C. with the introduction of carbonic acid. The reaction mixture is maintained at this temperature until a sample which is diluted with cresol to a solid body content of 40% exhibits a viscosity of 20′ DIN at 20° C. and utilizing a 4 mm. nozzle. Then 420 parts by weight of cresol are added under rapid stirring. The solution is cooled to 140° C. and mixed with a mixture of 15.75 parts by weight of butyl titanate, 70 parts by weight of cresol (DAE 6) and 19 parts by weight of solvent naphtha, as well as with a solution of 2.6 parts by weight of p-toluol-sulfonic acid in 35 parts by weight of dioxyacetone alcohol and 17 parts by weight of solvent naphtha. The reaction is then permitted to proceed at 140° C. until a viscosity of 10′ is obtained and at this time an additional 420 parts by weight of cresol is added.

The thus obtained approximately 48% solution can as desired be further diluted with solvents such as cresol, solvent naphtha, xylol, toluol, and the like.

The working up of the same as electro-insulation lacquer for copper wires and other electrical conducting wires takes place in the usual machines in the usual manner in the electro technique by applying several coatings and drying each individual layer in a continuous process. The elasticity, mechanical properties and surface hardness of the new lacquers are so high that it is possible to apply the same to the wires utilizing a fully automatic winding machine.

*Example 2*

202.9 parts by weight glycerine
183.5 parts by weight glycol
105.0 parts by weight of cresol (DAE 6)
815 parts by weight of terephthalic acid-dimethyl-ester
2 parts by weight of lead octoate wtih a lead content of 24%, and
5 parts by weight of calcium naphthenate with a calcium content of 4% are introduced into a three-necked flask as in Example 1. The heating occurs in the same manner so that a temperature increase of 5° C. per hour is achieved until a temperature of 205° C. is reached. At 190° C. the reaction is started by the introduction of carbonic acid. During the reaction process a distillate amounting to about 300 parts by weight of liquid is attained, the distillate consisting mainly of methanol. The reaction mixture is then cooled to about 180° C.

43.6 parts by weight of terephthalic acid are then added to the reaction mass, the same is heated to 215° C. and maintained at this temperature for 1 hour. The reaction mass is again cooled to 180° C. and 21.8 parts by weight of terephthalic acid are added, the reaction mass heated to 215° C. and maintained at this temperature for ¾ of an hour. During this esterification process approximately 18 parts by weight of distillate is obtained, the distillate consisting mainly of water. The reaction mass is then again cooled, when a temperature of 200° C. is obtained to 10.5 parts by weight of zinc octoate solution with a content of 8% zinc is added and the cooling continues until a temperature of 140° C. is obtained. The reaction mass is distilled at a pressure of 20–30 mm. mercury during three hours at a temperature of 140–175° C. There is thus obtained about 80–90 parts by weight of a distillate which consists mainly of cresol.

After the completion of the vacuum distillation the temperature is increased with the introduction of carbonic acid during a time period of 3 hours to 225° C. The reaction mixture is maintained at this temperature until a sample which is diluted with cresol to a solid body content of 40% exhibits a viscosity of 20′ DIN at 20° C. with a 4 mm. nozzle is obtained. Thereupon 420 parts by weight of cresol are added under rapid stirring. The solution is cooled to 140° C. and a mixture of 15.75 parts by weight of butyl titanate, 70 parts by weight of cresol (DAE 6) and 19 parts by weight of solvent naphtha as well as a solution of 1.7 parts by weight of p-toluol-sulfonic acid in 23 parts by weight of dioxyacetone alcohol and 11 parts by weight of solvent naphtha is added. The reaction then proceeds an additional 10 minutes at 140° C. and an additional amount of 420 parts by weight of cresol are then added.

The further working up of the approximately 48% solution occurs in the same manner as in Example 1.

*Example 3*

183.5 parts by weight of glycerine
202.9 parts by weight of glycol
105 parts by weight of cresol (DAE 6)
815 parts by weight of terephthalic acid-dimethyl-ester, and
6 parts by weight of butyl titanate are introduced in the above set forth sequence into a three-necked flask as in Example 1. The reaction mixture is rapidly heated to 140° C. and the temperature is then increased about 5° C. per hour until a temperature of 205° C. is reached. At 190° C. the reaction is condensed by the introduction of carbonic acid. During the reaction process a distillate amounting to about 300 parts by weight of liquid is obtained, this distillate consisting mainly of methanol. The reaction mixture is then cooled to about 180° C.

43.6 parts by weight of terephthalic acid are then added to the reaction mixture, the same is heated to a temperature of 215° C. and maintained at this temperature for one hour. It is then again cooled to 180° C. and an additional 43.6 parts by weight of terephthalic acid are added, the reaction mixture heated to 215° C. and maintained at this temperature for ¾ of an hour. During this esterification process approximately 25 parts by weight of distillate is obtained, the distillation consisting mainly of water. The reaction mixture is again then cooled and when a temperature of 200° C. is obtained 8 parts by weight of zinc naphthenate with a lead content of 24% lead is added and the reaction mixture further cooled to 140° C. The reaction mixture is then distilled under 30 mm. Hg of pressure during a time period of 3 hours at a temperature of 140–175° C. There is thus obtained about 80–90 parts by weight of a distillate which consists mainly of cresol.

The condensation after the vacuum distillation proceeds as in Example 1, at a temperature of 225° C. until a sample which is diluted with cresol to a solid body content of 40% exhibits a viscosity of 20′ DIN at 20° C. and with a 4 mm. nozzle. 420 parts by weight of cresol are then added under rapid stirring. This solution is then cooled to 140° C. and mixed with a mixture of 47.2 parts by weight of butyl titanate, 210 parts by weight of cresol (DAE 6) and 57 parts by weight of solvent naphtha as well as with a solution of 2.6 parts by weight of p-toluol-sulfonic acid in 35 parts by weight of dioxyacetone alcohol and 17 parts by weight of solvent naphtha. The reaction is then allowed to proceed an additional 10 minutes at 140° C. and thereupon an additional amount of 420 parts by weight of cresol are added.

The further working up proceeds as in Example 1.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing on a metal surface an interesterified, esterified, polycondensed and cross-linked high molecular weight polyester lacquer coating, comprising the steps of subjecting terephthalic acid-dimethyl ester to interesterification with a mixture of glycol and glycerol in an amount such that the hydroxyl groups of said glycol and glycerol are in excess of the amount of carboxyl reactive groups of said terephthalic acid-dimethyl ester by heating up to a temperature of about 205° C. in the presence of cresol and in the presence of an interesterification catalyst soluble in the reaction medium and being selected from the group consisting of naphthenates and octoates of zinc, cerium, lead, calcium, magnesium and aluminum, aluminum butylate and butyl titanate, the ratio of hydroxyl groups of said glycol to hydroxyl groups of said glycerol being between 1:0.9 and 1:1.1 and the ratio of carboxyl groups of said terephthalic acid-dimethyl ester to the hydroxyl groups of said glycol and glycerol being between 1.82:3 and 2.13:3, thereby obtaining an interesterified reaction product; heating said interesterified reaction product with free terephthalic acid at a temperature of about 180–220° C., the ratio of equivalents of said terephthalic acid-dimethyl ester to said terephthalic acid being between 2:0.2 and 2:0.4, and the ratio of total carboxyl groups of said terephthalic acid-dimethyl ester and of said terephthalic acid to the hydroxyl groups of said glycol and glycerol being between 2.1:3 and 2.4:3 so as to esterify said interesterified reaction product, thereby obtaining an esterification reaction product; heating said esterification reaction product at a temperature of about 220–230° C. in the presence of a polycondensation catalyst selected from the group consisting of zinc naphthenate, zinc octoate, lead naphthenate and lead octoate so as to polycondense the same, thereby obtaining a high molecular weight polyester lacquer base; adding cresol, to form a solution having a temperature of about 140° C., and also adding between about 1–2% of butyl titanate and between about 0.2–0.7% of p-toluol-sulfonic acid, calculated on the solid body content, to said polyester lacquer base so as to form a lacquer; applying said lacquer to a metal surface; and heating the thus applied lacquer on said metal surface so as to cross-link said polyester and bind o-titanic acid in the molecules thereof, thereby forming an electrically insulating coating on said metal surface.

2. An interesterified, esterified polycondensed and cross-linked high molecular weight polyester obtained in accordance with the method of claim 14.

3. An interesterified, esterified polycondensed and cross-linked high molecular weight polyester obtained in accordance with the method of claim 11.

4. An interesterified, esterified polycondensed and cross-linked high molecular weight polyester obtained in accordance with the method of claim 12.

5. A method of producing an interesterified, esterified, polycondensed and cross-linked high molecular weight polyester, comprising the steps of heating terephthalic acid-dimethyl-ester with a mixture of glycol and glycerol up to a temperature of about 205° C. utilizing a ratio of carboxyl groups of said terephthalic acid-dimethyl ester to total hydroxyl groups of said glycol and glycerol of 1.82:3 to 2.13:3, the ratio of hydroxyl groups of said glycol to hydroxyl groups of said glycerol being between 1:0.9 and 1:1.1, and in the presence of an interesterification catalyst which is soluble in said mixture, thereby obtaining an interesterified reaction product; heating the thus obtained interesterified reaction product with terephthalic acid at a temperature of about 180–220° C., the ratio of equivalents of said terephthalic acid-dimethyl-ester to said terephthalic acid being between 2:0.2 and 2:0.4 and the ratio of total carboxyl groups of said terephthalic acid-dimethyl-ester and of said terephthalic acid to the total hydroxyl groups of said glycol and glycerol being between 2.1:3 and 2.4:3, thereby obtaining an esterification reaction product; heating the thus obtained esterification reaction product at a temperature of 220–230° C. so as to polycondense said esterification reaction product, thereby obtaining a high molecular weight polyester; and reacting the polycondensed product at a temperature of about 140° C. with 1–2% by weight of butyl titanate and between about 0.2–0.7% of p-toluol-sulfonic acid, calculated on the solid body content, and in the presence of cresol so as to cross-link said polyester and bind o-titanic acid in the molecules thereof, thereby forming a cured polyester of high suitability for electrical insulation.

6. A method of producing an interesterified, esterified, polycondensed and cross-linked high molecular weight polyester, comprising the steps of heating terephthalic acid-dimethyl-ester with a mixture of glycol and glycerol up to a temperature of about 205° C. utilizing a ratio of carboxyl groups of said terephthalic acid-dimethyl-ester to total hydroxyl groups of said glycol and glycerol of 1.82:3 to 2.13:3, the ratio of glycol hydroxyl groups to glycerol hydroxyl groups being between 1:0.9 and 1:1.1, in the presence of an interesterification catalyst soluble in said mixture and selected from the group consisting of naphthenates and octoates of zinc, cerium, lead, calcium, magnesium and aluminum, aluminum butylate and butyl titanate, and in the presence of cresol, thereby obtaining an interesterified reaction product; heating the thus obtained interesterified reaction product with terephthalic acid at a temperature of about 180–220° C., the ratio of equivalents of said terephthalic acid-dimethyl-ester to said terephthalic acid being about 2:0.2 and 2:0.4 and the ratio of total carboxyl groups of said terephthalic acid-dimethyl-ester and of said terephthalic acid to the total hydroxyl groups of said glycol and glycerol being between 2.1:3 and 2.4:3, thereby obtaining an esterification reaction product; distilling off said cresol; heating the thus obtained esterification reaction product at a temperature of about 220–230° C. and in the presence of a polycondensation catalyst selected from the group consisting of zinc naphthenate, zinc octoate, lead naphthenate and lead octoate, so as to polycondense said esterification reaction product and to obtain a high molecular weight polyester; dissolving the thus obtained high molecular weight polyester in cresol; and heating the thus obtained polycondensed high molecular weight polyester solution in the presence of 1–2% of butyl titanate and between about 0.2–0.7% p-toluol-sulfonic acid calculated on the solid body content so as to cross-link said polyester and bind o-titanic acid in the molecules thereof, thereby forming a cured polyester of high suitability for electrical insulation.

7. A method of producing on a metal surface an interesterified, esterified, polycondensed and cross-linked high molecular weight polyester lacquer coating, comprising the steps of heating terephthalic acid-dimethyl-ester to interesterification with a mixture of glycol and glycerol up to a temperature of about 205° C. utilizing a ratio of carboxyl groups of said terephthalic acid-dimethyl-ester to total hydroxyl groups of said glycol and glycerol of 1.82:3 to 2.13:3, the ratio of glycol hydroxyl groups to glycerol hydroxyl groups being between 1:0.9 and 1:1.1, and in the presence of an interesterification catalyst which is soluble in said mixture, thereby obtaining an interesterified reaction product; heating the thus obtained interesterified reaction product with terephthalic acid at a temperature of about 180–220° C., the ratio of equivalents of said terephthalic acid-dimethyl-ester to said terephthalic acid being between about 2:0.2 and 2:0.4 and the ratio of total carboxyl groups of said terephthalic acid-dimethyl-ester and of said terephthalic acid to the total hydroxyl groups of said glycol and glycerol being between 2.1:3 and 2.4:3, thereby obtaining an esterification reaction product; heating the thus obtained esterification reaction product at a temperature of 220–230° C. so as to polycondense said esterification reaction product, thereby obtaining a high molecular weight polyester lacquer base;

dissolving said polyester lacquer base in cresol so as to form a hot solution; introducing into said hot solution 1–2% of butyl titanate and 0.2–0.7% of p-toluol-sulfonic acid calculated on the solid body content of said hot solution; further heating the latter for a relatively short period of time; diluting the thus heated solution with a solvent including cresol so as to form a lacquer; applying said lacquer to a metal wire; and heating said lacquer on said wire so as to cross-link said polyester and bind o-titanic acid in the molecules thereof, thereby forming an electrically insulated coated wire.

8. An interesterified, esterified polycondensed and cross-linked high molecular weight polyester obtained in accordance with the method of claim 5.

9. An interesterified, esterified polycondensed and cross-linked high molecular weight polyester obtained in accordance with the method of claim 6.

10. An insulated wire, comprising, in combination, a metal wire; and a coating substantially completely covering said metal wire, said coating consisting essentially of an interesterified esterified, polycondensed and cross-linked high molecular weight polyester, obtained in accordance with the method of claim 14.

11. A method of producing an interesterified, esterified, polycondensed and cross-linked high molecular weight polyester, comprising the steps of heating terephthalic acid-dimethyl-ester with a mixture of glycol and glycerol up to a temperature of about 205° C. utilizing a ratio of carboxyl groups to hydroxyl groups of about 2:3 and a ratio of glycol hydroxyl groups to glycerol hydroxyl groups of about 1:1, and in the presence of an interesterification catalyst which is soluble in said mixture, thereby obtaining an interesterified reaction product; heating the thus obtained reaction product with terephthalic acid at a temperature of about 180–220° C., the ratio of equivalents of said terephthalic acid-dimethyl-ester to said terephthalic acid being between 2:0.2 and 2:0.4 and the ratio of total carboxyl groups to total hydroxyl groups being about 2.25:3, thereby obtaining an esterification reaction product; heating the thus obtained esterification reaction product at a temperature of about 220–230° C. so as to polycondense said esterification reaction product, thereby obtaining a high molecular weight polyester lacquer base; and heating the thus obtained polycondensed high molecular weight polyester in the presence of cresol as a solvent and of 1–2% butyl titanate and between about 0.2–0.7%, calculated on the solid body content of said polycondensed polyester, of p-toluol-sulfonic acid, so as to cross-link said polyester and bind o-titanic acid in the molecules thereof, thereby forming a cured polyester of high suitability for electrical insulation.

12. A method of producing an interesterified, esterified, polycondensed and cross-linked high molecular weight polyester, comprising the steps of heating terephthalic acid-dimethyl-ester with a mixture of glycol and glycerol up to a temperature of about 205° C. utilizing a ratio of carboxyl groups to hydroxyl groups of 1.82:3 to 2.13:3, the ratio of glycol hydroxyl groups to glycerol hydroxyl groups being between 1:0.9 and 1:1.1 in the presence of an interesterification catalyst soluble in said mixture in the presence of cresol, thereby obtaining an interesterified reaction product; heating the thus obtained interesterified reaction product with terephthalic acid at a temperature of about 180–220° C., the ratio of equivalents of said terephthalic acid-dimethyl-ester to said terephthalic acid being between 2:0.2 and 2:0.4 and the ratio of total carboxyl groups of said terephthalic acid-dimethyl-ester and of said terephthalic acid to the hydroxyl groups of said glycol and glycerol being between 2.1:3 and 2.4:3, thereby obtaining an esterification reaction product; distilling off said cresol; heating the thus obtained esterification reaction product at a temperature of about 220–230° C. so as to polycondense said esterification reaction product, thereby obtaining a high molecular weight polyester lacquer base; and heating the thus obtained polycondensed high molecular weight polyester in the presence of cresol as a solvent and of 1–2% of butyl titanate and between about 0.2–0.7% of p-toluol-sulfonic acid calculated on the solid body content, so as to cross-link said polyester and bind o-titanic acid in the molecules thereof, thereby forming a cured polyester of high suitability for electrical insulation.

13. A method as defined in claim 6, wherein said heating of said polycondensed high molecular weight polyester solution in the presence of p-toluol-sulfonic acid and butyl titanate is carried out at a temperature within the vicinity of 140° C.

14. A method of producing an interesterified, esterified, polycondensed and cross-linked high molecular weight polyester, comprising the steps of subjecting terephthalic acid-dimethyl-ester to interesterification with a mixture of glycol and glycerol in an amount such that the hydroxyl groups of said glycol and glycerol are in excess of the amount of carboxyl reactive groups of the dimethyl terephthalate, the ratio of hydroxyl groups of said glycol to hydroxyl groups of said glycerol being between 1:0.9 and 1:1.1, and in the presence of an interesterification catalyst which is soluble in said mixture, thereby obtaining an interesterified reaction product; esterifying the thus obtained interesterified reaction product with terephthalic acid, the ratio of equivalents of said terephthalic acid-dimethyl-ester to said terephthalic acid being between 2:0.2 and 2:0.4 and the ratio of total carboxyl groups of said terephthalic acid-dimethyl-ester and of said terephthalic acid to the hydroxyl groups of said glycol and glycerol being between 2.1:3 and 2.4:3, thereby obtaining an esterification reaction product; subjecting the thus obtained esterification reaction product to polycondensation, thereby obtaining a high molecular weight polyester lacquer base; and heating the thus obtained polycondensed high molecular weight polyester in the presence of cresol as a solvent and of 1–2% of butyl titanate and of between about 0.2–0.7% of p-toluol-sulfonic acid calculated on the solid body content so as to cross-link said polyester and bind o-titanic acid in the molecules thereof, thereby forming a cured polyester of high suitability for electrical insulation.

References Cited by the Examiner

UNITED STATES PATENTS

| 2,917,414 | 12/1959 | McLean | 260—75 |
| 2,936,296 | 10/1960 | Prepopio et al. | 260—75 |

FOREIGN PATENTS

| 728,550 | 4/1955 | Great Britain. |
| 775,030 | 5/1957 | Great Britain. |

WILLIAM H. SHORT, *Primary Examiner.*

L. P. QUAST, *Assistant Examiner.*